United States Patent
Umeno et al.

(10) Patent No.: US 6,770,399 B2
(45) Date of Patent: Aug. 3, 2004

(54) COMPOSITE MATERIAL FOR ANODE OF LITHIUM SECONDARY BATTERY, AND LITHIUM SECONDARY BATTERY

(75) Inventors: Tatsuo Umeno, Fukuoka (JP); Kenji Fukuda, Fukuoka (JP); Tadanori Tsunawaki, Fukuoka (JP); Youichiro Hara, Fukuoka (JP)

(73) Assignee: Mitsui Mining Co., Ltd., Tokyo (JP)

( * ) Notice: Subject to any disclaimer, the term of this patent is extended or adjusted under 35 U.S.C. 154(b) by 198 days.

(21) Appl. No.: 09/999,238

(22) Filed: Oct. 31, 2001

(65) Prior Publication Data

US 2002/0086211 A1 Jul. 4, 2002

(30) Foreign Application Priority Data

Nov. 14, 2000 (JP) ........................................ 2000-346090
Mar. 29, 2001 (JP) ........................................ 2001-096239

(51) Int. Cl.$^7$ ............................................... H01M 4/48
(52) U.S. Cl. ............................... 429/231.8; 429/231.4; 429/232; 429/233; 429/218.1; 252/182.1
(58) Field of Search .......................... 429/231.8, 231.4, 429/232, 233, 218.1; 252/182.1

(56) References Cited

U.S. PATENT DOCUMENTS

| | | | |
|---|---|---|---|
| 6,383,686 B1 * | 5/2002 | Umeno et al. | 429/231.8 |
| 6,432,583 B1 * | 8/2002 | Fukuda et al. | 429/231.4 |
| 6,589,696 B2 * | 7/2003 | Matsubara et al. | 429/231.8 |

FOREIGN PATENT DOCUMENTS

| JP | P2000-215887 A | 4/2000 |
|---|---|---|
| JP | P2001-283848 A | 10/2001 |

* cited by examiner

Primary Examiner—Laura Weiner
(74) Attorney, Agent, or Firm—Norris McLaughlin & Marcus P.A.

(57) ABSTRACT

The present invention discloses a composite material for anode of lithium secondary battery, comprising:
 a porous particle nucleus formed by bonding of at least silicon-containing particles and carbon-containing particles, and
 a carbon-made covering layer formed thereon; and a process for producing such a composite material. The composite material has an average particle diameter of preferably 0.1 to 50 μm and a specific surface area of preferably 5 m$^2$/g or less. In the composite material, the silicon content in the porous particle nucleus is 10 to 90% by mass.

10 Claims, 4 Drawing Sheets

COMPOSITE MATERIAL FOR ANODE OF LITHIUM SECONDARY BATTERY, AND LITHIUM SECONDARY BATTERY

BACKGROUND OF THE INVENTION

1. Field of the Invention

The present invention relates to a composite material for anode which enables production of a lithium secondary battery large in charge-discharge capacity, superior in safety and excellent in charge-discharge cycle property; a process for production of the composite material for anode; an anode produced by using the composite material for anode; and a lithium secondary battery produced by using the the composite material for anode.

2. Description of the Related Art

As electronic appliances have become smaller and lighter, the batteries used therein are required to have a higher energy density. The batteries used therein are also required to allow repeated charge and discharge, from the standpoint of resource saving. In order to respond to these requirements, secondary batteries using lithium were proposed and developed.

Secondary batteries using lithium used metallic lithium as the anode material, at the initial stage of development of such batteries. Secondary batteries using metallic lithium as the anode, i.e. metallic lithium secondary batteries, however, have problems of being inferior in charge speed and short in cycle life. These metallic lithium secondary batteries further have a problem in safety because they generate dendrite and the dendrite may cause combustion and explosion. Hence, currently, lithium secondary batteries using a carbon-based material and/or a graphite-based material as the anode, i.e. lithium ion secondary batteries are in wide practical use.

In order to allow the lithium ion secondary batteries and other lithium secondary batteries to have higher discharge capacities, researches are being continued on the cathode material, anode material and electrolyte used therein. As the cathode material, $LiCoO_2$ has been used widely. It is because $LiCoO_2$ is easy to produce, has high stability at high temperatures, and possesses relatively high safety.

Recently, it has been investigated to produce a cathode using $LiNiO_2$ having a larger theoretical discharge capacity than $LiCoO_2$ has.

Regarding the anode material, metallic lithium has a theoretical discharge capacity of 4,000 mAh/g which is far larger than that (372 mAh/g) of graphite. Hence, vigorous researches are under way on lithium secondary batteries using metallic lithium as the anode material, in order to obtain a lithium secondary battery of high discharge capacity free from any problem in cycle life or safety. A research is also under way on the use of a lithium alloy having a discharge capacity close to that of metallic lithium, as an anode material.

Also, various studies on the electrolyte are under way. These studies include the improvement in solid electrolyte of lithium solid secondary battery and the improvement in polymer electrolyte of polymer lithium secondary battery.

It is no exaggeration to say that the improvement in discharge capacity of lithium secondary battery depends on the improvement in discharge capacity of anode material used in the battery.

As mentioned above, it is being attempted in the research of lithium secondary battery to use a lithium alloy as the anode material of battery. As the lithium alloy, there can be mentioned, for example, a lithium-tin alloy, a lithium-lead alloy, a lithium-bismuth alloy, a lithium-aluminum alloy, a lithium-arsenic alloy, a lithium-silicon alloy and a lithium-antimony alloy.

One of the above alloys may be used per se as an anode material to produce a lithium battery. In many cases, however, a metal or semimetal capable of forming an alloy with lithium is used as an anode material, to produce a battery. During the charging of the battery produced, the metal or semimetal is allowed to react electrochemically with the lithium released from the cathode, in the battery and becomes an alloy, whereby an anode material made of a lithium alloy is formed.

In this method, however, the volume of the anode material expands, during alloying, to several times the volume of the anode material before alloying, which causes powdering of the anode material. As a result, there is no sufficient improvement in safety and cycle property of battery. Therefore, no lithium secondary battery using a lithium alloy as the anode material is in practical use currently.

The biggest problem appearing when a lithium alloy is used as the anode material of battery, is that, as described above, the anode volume expands at the time of lithium alloy formation, causes powdering and resultant anode destruction.

The present inventors made a study and found out that covering of a metal or semimetal capable of forming a lithium alloy, with carbon can prevent the powdering of anode material and the consequent destruction of anode.

That is, by using particles of a metal or semimetal capable of forming a lithium alloy, as nuclei and covering each of the nuclei with carbon, there can be obtained a composite material having a double structure consisting of particle nucleus and a covering layer.

When a lithium secondary battery is formed using this composite material as the anode material and is charged, the particle nuclei in the anode material, i.e. the metal or semimetal changes into a lithium alloy. In the change, however, the expansion of the anode material is suppressed by the large restrictive force of the carbon covering layer formed on the nuclei, and the powdering of anode material and the destruction of anode are prevented.

The covering of particle nuclei with carbon can be conducted by various methods. Each method, however, must be such that the covering layer formed has a strength capable of sufficiently suppressing the volume expansion of particle nuclei associated with the alloying of particle nuclei and moreover can cover each of the particle nuclei uniformly and completely.

As a result of a study, the present inventors found out that, of the various covering methods employable, a method of covering particle nuclei with carbon by chemical vapor deposition can generate a restrictive force capable of sufficiently suppressing the volume expansion of particle nuclei and moreover can cover the particle nuclei uniformly and completely with a small amount of carbon. Therefore, this method was found to be a particularly preferred method for covering particle nuclei.

It was found out that preferred as the material for particle nuclei are titanium, iron, boron, silicon, etc. selected from metals and semimetals each capable of forming a lithium alloy and particularly preferred is silicon (JP-A-2000-215887).

When silicon (as particle nuclei) was covered with carbon to form a composite material and a battery was produced using the composite material as an anode material and subjected to charge and discharge, however, it was found that no high charge-discharge speeds are obtainable because silicon has low electrical conductivity and its reaction with lithium is non-uniform.

It was also found that although a carbon covering layer formed on silicon (particle nuclei) has a large restrictive force capable of suppressing the expansion of particle nuclei associated with the alloying, the restrictive force becomes insufficient in repeated charge and discharge when the carbon amount of the carbon covering layer is small.

Hence, it was proposed to use, as particle nuclei, a mixture of silicon and a highly conductive addition element, in place of silicon alone (Japanese Patent Application No. 2000-92810).

By the action of the addition element, the intercalation of lithium into particle nuclei and alloying of silicon with lithium became uniform, making it possible to obtain higher charge and discharge speeds.

The action of the addition element also restricted the expansion of particle nuclei associated with alloying. As a result, the expansion of particle nuclei was restricted by the two actions of the addition element and the carbon of the covering layer, whereby the powdering of anode material and the destruction of anode could be prevented more reliably.

Even in a secondary battery using such an anode material as the anode, however, it was found that the voltage at the completion of charge operation is unstable, rapid heat generation, dendrite formation, etc. occur depending upon the battery use conditions, and the secondary battery may have a problem in safety.

SUMMARY OF THE INVENTION

In view of the above situation, the present invention aims at solving the problems of the prior art and providing a composite material for anode of lithium secondary battery, large in discharge capacity, superior in safety and excellent in charge-discharge cycle property, a process for producing the composite material, an anode using the composite material, and a lithium secondary battery using the composite material.

The above aims are achieved by the following inventions.

[1] A composite material for anode of lithium secondary battery, comprising:
   a porous particle nucleus formed by bonding of at least silicon-containing particles and carbon-containing particles, and
   a carbon-made covering layer formed thereon.
[2] A composite material for anode of lithium secondary battery, according to [1], having an average particle diameter of 0.1 to 50 μm and a specific surface area of 5 m²/g or less.
[3] A composite material for anode of lithium secondary battery, according to [1], wherein the proportion of the covering layer in the composite material is 5 to 60% by mass.
[4] A composite material for anode of lithium secondary battery, according to [1], wherein the silicon content in the porous particle nucleus is 10 to 90% by mass.
[5] A composite material for anode of lithium secondary battery, according to [1], wherein the carbon-containing particles have a specific resistance of 1.0 Ω·cm or less.
[6] An anode of lithium secondary battery, obtained by adhering a composite material for anode of lithium secondary battery set forth in any of [1] to [5], to a current collector.
[7] A lithium secondary battery containing, in the anode, a composite material for anode of lithium secondary battery set forth in any of [1] to [5].

[8] A process for producing a composite material for anode of lithium secondary battery, which comprises:
   a particle nuclei-producing step of subjecting a mixture of silicon and carbon to grinding and granulation to produce porous particle nuclei, and
   a covering layer-forming step of forming a covering layer on each of the porous particle nuclei produced above.
[9] A process for producing a composite material for anode of lithium secondary battery, according to [8], wherein the carbon has a specific resistance of 1.0 Ω·cm or less.
[10] A process for producing a composite material for anode of lithium secondary battery, according to [8] or [9], wherein the covering layer-forming step is conducted by chemical vapor deposition.

The composite material of the present invention comprises a porous particle nucleus in which silicon-containing particles and carbon-containing particles are finely dispersed in each other and bonded to each other. In this porous particle nucleus, both silicon-containing particles and carbon-containing particles are dispersed in fine particles. Therefore, the porous particle nucleus has high conductivity, enabling uniform intercalation of lithium ion into silicon and uniform alloying. As a result, a lithium secondary battery produced by using the composite material containing such a porous particle nucleus can have high charge and discharge speeds.

The porous particle nucleus has appropriate voids inside, and the voids absorb the volume expansion taking place during alloying of silicon. This can reduce the amount of carbon required for suppression of the volume expansion taking place during alloying of silicon. As a result, the amount of carbon in the covering layer of the composite material can be reduced, resulting in larger charge and discharge capacities per mass.

When a lithium secondary battery is produced using such a composite material and charged, the final voltage of the battery is stabilized at about the same level as that of the carbon particles surrounding silicon particles; therefore, in the battery, generation of dendrite can be prevented. Thus, by using such a composite material as an anode material of lithium secondary battery, there can be provided a lithium secondary battery having high safety, a large discharge capacity and excellent charge-discharge cycle property.

DETAILED DESCRIPTION OF THE PREFERRED EMBODIMENTS

The present invention is described in detail below.

Figure 7:
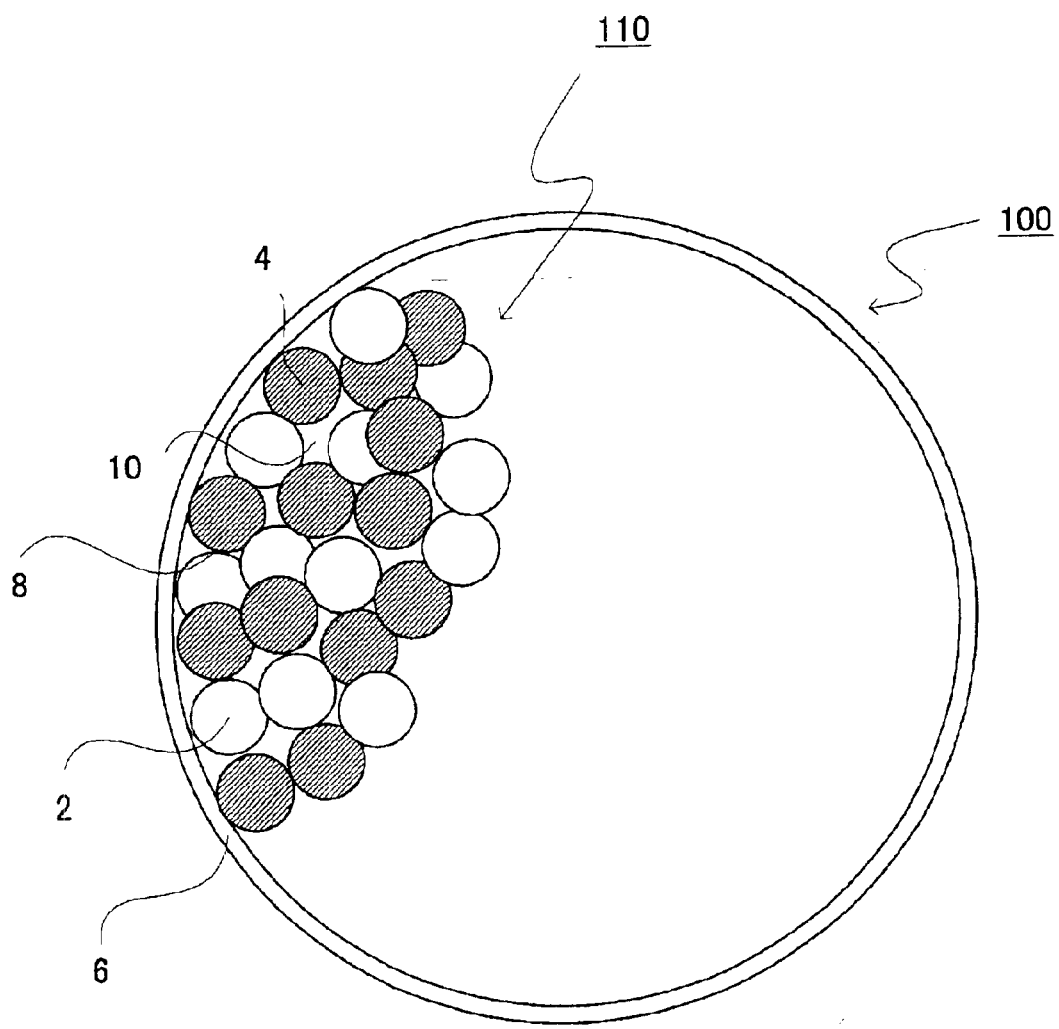
FIG. 7 is a drawing showing a constitution of the composite material of the present invention.

As shown in FIG. 7, the composite material 100 for anode according to the present invention is constituted by a porous particle nucleus 110 formed by bonding of at least silicon-containing particles 2 and carbon-containing particles 4, and a covering layer 6 made of carbon, formed on the porous particle nucleus 110. The silicon-containing particles 2 and the carbon-containing particles 4 bond to each other at the bonded parts 8 where the two kinds of particles are in contact with each other, to become integral and form a porous particle nucleus 110. There are voids 10 between the silicon-containing particles 2 and the carbon-containing particles 4.

The silicon-containing particles 2 may be crystalline or non-crystalline. The silicon content in each silicon-containing particle is preferably as high as possible. The presence of a slight amount of impurities in the particles 2 hardly affects the performance of the battery produced using such particles because the discharge capacity of silicon per se is 4,400 mAh/g and is extremely high as compared with, for example, the discharge capacity (372 mAh/g) of graphite. Therefore, as the silicon-containing particles, there can be safely used any silicon-containing particles which are industrially produced at a low cost and have a silicon content of 95% by mass or more.

However, it is not preferred that the silicon-containing particles contain impurities of halogen type (e.g. chlorine), or impurities such as electrochemically active metal and the like. The presence of such impurities generates lithium dendrite owing to the low charge voltage of the lithium secondary battery produced, or causes an increase in irreversible capacity, markedly impairing the performance of the battery.

As the carbon-containing particles 4, there are preferred those having a thermal history of 750° C. or more, such as pyrolytic carbon (e.g. carbon black or acetylene black), graphite, fired carbon, charcoal and the like.

The carbon content in the carbon-containing particles needs to be 92% by mass or more for conductivity and is preferably 98% by mass or more.

The conductivity of the carbon-containing particles can be examined by measuring the specific resistance when the carbon-containing particles of powdery state have been pressed. In the present invention, "specific resistance" refers to a specific resistance when the carbon-containing particles have been pressed at a pressure of 300 kg/cm$^2$ and an electric current has been passed through the pressed carbon-containing particles in the press direction. The specific resistance of the carbon-containing particles is preferably 1.0 Ω·cm or less, more preferably 0.1 Ω·cm or less. By using carbon-containing particles having a specific resistance of 1.0 Ω·cm or less, porous particle nuclei of high conductivity can be obtained.

The proportion of silicon in the porous particle nucleus 110 is preferably 10 to 90% by mass. However, the silicon-containing particles must be used so that the alloying between silicon and lithium can take place at the highest extent and the surface area of the silicon-containing particles in each porous particle nucleus becomes as large as possible. Therefore, the most preferable proportion of the silicon-containing particles is 40 to 90% by mass and accordingly the most preferably proportion of the carbon-containing particles becomes 10 to 60% by mass.

In the porous particle nucleus, it is preferable that the silicon-containing particles and the carbon-containing particles are dispersed in each other as finely as possible and bonded to each other, that is, they are dispersed in each other uniformly in a fine powder state and bonded to each other.

Thereby, the particle nucleus can have high conductivity; when this nucleus is used as an anode of battery, the intercalation of lithium ion into silicon and their alloying take place uniformly; as a result, the resulting battery can have increased charge and discharge speeds.

The porous particle nucleus formed by bonding of the silicon-containing particles, the carbon-containing particles, etc. has voids 10 inside. The voids absorb the volume expansion caused by alloying between silicon and lithium and reduce the expansion force of the particle nucleus. As a result, the amount of the carbon in the covering layer formed on the particle nucleus can be reduced. The voids are preferably 5 to 30% by volume of the particle nucleus.

The silicon-containing particles and the carbon-containing particles both constituting the porous particle nucleus are preferably particles as fine as possible. Specifically, they are fine particles having particle diameters of preferably 1 μm or less, more preferably 0.01 to 0.5 μm, particularly preferably 0.05 to 0.29 μm.

The porous particle nucleus formed by bonding of the silicon-containing particles and the carbon-containing particles has an average particle diameter of preferably 0.1 to 50 μm, particularly preferably 1 to 30 μm.

On the porous particle nucleus is formed a covering layer made of carbon. Therefore, the porous particle nucleus needs to have such a strength that the particle nucleus is not broken when the covering layer is formed thereon.

In order to form a porous particle nucleus having such a strength, it is necessary that a silicon material and a carbon material are mixed, finely ground and further granulated so as to have a required strength.

In order to carry out this operation, it is considered, for example, to finely grind a silicon material and a carbon material and then conducting granulation using a binder. This procedure, however, is very complicated.

The particularly preferred procedure for forming a porous particle nucleus having a required strength is grinding and compression which is described below.

In the porous particle nuclei-producing step by grinding and compression, an impact compression force is added to a mixture of a silicon material and a carbon material, whereby the two materials are crushed and finely ground and moreover are finely dispersed in each other. Simultaneously therewith, there is formed a particle agglomerate in which silicon fine particles and carbon fine particles are dispersed, because the impact compression force added to the mixture has a function of combining (granulating) a plurality of particles. By repeating this procedure, ideal porous particle nuclei having a required strength can be obtained.

The above impact compression force has also a function of giving rise to mechanical alloying at the interfaces between silicon fine particles and carbon fine particles. It is presumed that, owing to this function, the silicon fine particles and the carbon fine particles give rise to partial alloying at their contact parts and, owing to this alloying, the two kinds of fine particles are strongly bonded to each other.

Individual porous particle nuclei are formed by bonding of silicon fine particles and carbon fine particles. A plurality of these porous particle nuclei of relatively small size may combine with each other to form a porous particle nucleus of secondary bonding. Further, a plurality of such porous particle nuclei of secondary bonding may combine with each other to form a porous particle nucleus of tertiary or even higher bonding. When grinding and compression is used for production of porous particle nuclei, the particle nuclei obtained contain such particle nuclei of secondary or higher bonding.

When grinding and compression is used, porous particle nuclei having a void ratio of about 10% or more are obtained.

Therefore, it is preferred to use, in the particle nuclei-producing step, grinding and compression which comprises adding an impact compression force to a mixture of a silicon material and a carbon material to conduct fine grinding and, simultaneously therewith, granulation. It is also preferred to use grinding and compression capable of giving rise to mechanical alloying.

The particle nuclei-producing step employing grinding and compression can be conducted using an ordinary grinder. The grinder can be exemplified by a planetary mill, a vibration ball mill, a rod mill and a ball mill using large balls. The large balls have a diameter of, for example, 50 mm or more.

A ball mill using small balls is unsuitable because it gives a small compression force. For the same reason, a grinder utilizing a collision force of particles or a frictional force between particles is unsuitable.

The particle nuclei-producing step is preferably conducted in an inert gas atmosphere in order to prevent the silicon material and the carbon material from being oxidized.

The time of grinding and granulation is preferably 1 to 120 hours although it varies depending upon the grinder used, the amount of raw materials fed, etc.

The average particle diameter of the porous particle nuclei produced is preferably 0.1 to 50 μm, particularly preferably 1 to 30 μm, as described previously. It is because the average particle diameter of the composite material for anode of the present invention, produced by covering each porous particle nucleus with carbon is preferably 0.1 to 50 μm.

As the particle diameter of each porous particle nucleus is smaller, the specific surface area thereof is larger and the amount of the carbon required to completely cover the surface of the nucleus is larger. A battery using, as the anode material, a composite material having a larger surface area is lower in initial charge efficiency because, with such a composite material, a protective film tends to be generated in a larger amount during initial charge.

Conversely, when the particle diameter of each porous particle nucleus is larger, the surface area thereof is smaller and the amount of the carbon required to cover the nucleus surface is smaller. However, when a composite material for anode produced using a porous particle nucleus of large particle diameter is coated on a current collector to produce an anode, the anode hardly has a smooth surface. As a result, problems such as peeling of composite material from current collector, and the like tend to occur.

The composite material for anode of the present invention can be produced by treating each porous particle nucleus in a covering layer-forming step. In this step, a covering layer made of carbon is formed on the outer surface of the particle nucleus.

The covering layer made of carbon is formed in order to obtain a restrictive force against the volume expansion associated with alloying of each porous particle nucleus. By minimizing the volume expansion associated with alloying between silicon and lithium, the powdering and destruction of anode are prevented.

Each particle nucleus must be covered at the outer surface with the covering layer of carbon uniformly and completely.

The uniformity of the covering can be examined by measuring the specific surface area of the composite material. As the covering approaches uniform and complete covering, the specific surface area is smaller. The specific surface area is preferably 5 $m^2/g$ or less.

The amount of the carbon used for coverage is preferably as small as possible as long as the covering of the porous particle nucleus is complete and a sufficient restrictive force against the volume expansion of particle nucleus is obtained. When the amount of the carbon used for coverage is large, the composite material tends to bond with each other and form secondary particles, in the covering layer-forming step. Therefore, the proportion of the carbon of the covering layer in the composite material is preferably 60% by mass or less.

With respect to the crystallinity of the carbon of the covering layer, a high crystallinity is preferred for high conductivity. With a high crystallinity, however, the strength between the carbon planes constituting the covering layer is low. Consequently, the restrictive force against the volume expansion of the porous particle nucleus is low.

Therefore, the crystallinity of the carbon of the covering layer is preferably 0.68 to 0.72 nm in terms of lattice constant [$Co_{(002)}$].

The coverage of the porous particle nucleus with carbon can be conducted, for example, by covering porous particle nuclei with a resin, for example, a synthetic resin such as phenolic resin, imide resin, COPNA resin or the like and then subjecting the resin to an infusibilization treatment and further to carbonization at 900 to 1,200° C.

The coverage of the porous particle nucleus with carbon can also be conducted by covering particle nuclei with a known tar or pitch and then subjecting the tar or pitch to an infusibilization treatment and further to carbonization at 900 to 1,200° C.

The infusibilization treatment may be omitted by using a resin such as aromatic sulfonic acid salt or the like.

These methods for carbon coverage are simple and effective, but are difficult to achieve complete coverage of particle nucleus with a small amount of carbon. In order to achieve complete coverage by these methods, a carbon amount of 20% by mass or more relative to the particle nucleus is required.

The reasons are that the resin or the tar or pitch as a carbon source gives a small carbonization yield and that such a carbon source gives a large volume contraction in carbonization (this tends to generate cracks in the resulting covering layer) and, in order to avoid such cracks, an increased amount of carbon need be used for coverage.

The coverage of the porous particle nucleus with carbon is conducted most preferably by chemical vapor deposition which comprises introducing a vapor of an organic substance into particle nuclei while heating the nuclei in an inert gas atmosphere, to carbonize the vapor on the particle nuclei and deposit the resulting carbon thereon.

This chemical vapor deposition is conducted particularly preferably in a fluidized state of particle nuclei.

By conducting the chemical vapor deposition in a fluidized state of particle nuclei, a covering layer consisting of a carbon film can be formed uniformly and completely on the outer surface of each particle nucleus.

In the chemical vapor deposition, the amount of the covering layer carbon can be controlled as desired. The amount of the covering layer carbon is preferably 5 to 60% by mass relative to the composite material obtained.

When the amount of the covering layer carbon is less than 5% by mass, the coverage by carbon may be insufficient. When the amount is more than 60% by mass, the above-mentioned formation of secondary particles is striking.

In the chemical vapor deposition, the surface of each particle nucleus can be covered with carbon uniformly and completely; therefore, it is easy to allow the composite material obtained to have a specific surface area of 5 $m^2/g$ or less. Further in the chemical vapor deposition, it is possible to control the crystallinity of the covering carbon at 0.68 to 0.72 nm in terms of lattice constant [$Co_{(002)}$]. With the chemical vapor deposition, it is possible to obtain high conductivity and a large restrictive force against the volume expansion associated with alloying.

The temperature of the chemical vapor deposition is preferably 700 to 1,200° C., more preferably 850 to 1,100° C. When the temperature is less than 700° C., the deposition rate of the pyrolytic carbon in the chemical vapor deposition is small and the time of the chemical vapor deposition is long. Further, when the temperature is less than 700° C., the deposited carbon per se has a high electric resistance, resulting in low charge-discharge speeds. Furthermore, the deposited carbon has a small strength, resulting in an insufficient restrictive force against the volume expansion associated with alloying.

As the temperature of the chemical vapor deposition gets higher, the conversion of the organic substance gas (which is a raw material for vapor deposition) into carbon becomes higher. However, the deposited carbon does not grow in a filmy state on the surface of each particle nucleus and grows rather in a fiber shape thereon. The deposited carbon grown in a fiber shape is unsuitable as a covering layer intended for surface coverage. Therefore, the temperature of the chemical vapor deposition is preferably 1,200° C. or less.

As the organic substance usable as a carbon source in the chemical vapor deposition, there can be mentioned, for example, aromatic compounds such as benzene, toluene, xylene, styrene, ethylbenzene, diphenylmethane, diphenyl, naphthalene, phenol, cresol, nitrobenzene, chlorobenzene and the like; indene; coumarone; pyridine; anthracene; phenanthrene; mixtures thereof; components obtained in tar distillation, such as gas light oil, creosote oil, anthracene oil and the like; and naphtha-cracked tar.

There can also be used aliphatic hydrocarbons such as methane, ethane, propane, butane, pentane, hexane and the like, singly or in admixture. There can also be used acetylene, ethylene, propylene, isopropylene, butadiene, etc.

When a chlorine compound such as trichloroethylene, dichloroethylene or the like is used, the temperature of the chemical vapor deposition can be as low as 700 to 800° C.

There is no particular restriction as to the method for producing an anode of lithium secondary battery using the composite material of the present invention. The anode can be produced, for example, by kneading the composite material with a binder and a solvent sufficiently to obtain a slurry and adhering the slurry to a current collector such as metal mesh, metal foil or the like under pressure.

As the binder, there can be mentioned, for example, a polyvinylidene fluoride (PVDF), a carboxyl group-modified PVDF obtained by substituting part of a PVDF with carboxyl group, a carboxymethyl cellulose (CMC), and a styrene-butadiene rubber (SBR) latex. Of these, the carboxyl group-modified PVDF has a high bonding force and shows high stretchability in a solvent for electrolyte of battery, and can therefore withstand the expansion of the composite material. The carboxyl group-modified PVDF further shows good wettability to the composite material and accordingly is a preferred binder.

As examples of the carboxyl group-modified PVDF, there can be mentioned L#9306 and L#9130 (brand names) produced by Kureha Chemical Industry Co., Ltd.

The amount of the binder added differs depending upon the particle size of the composite material, but is preferably 3 to 15% by mass relative to the anode material in order to obtain a sufficient adhesion strength.

In producing a lithium secondary battery using the composite material of the present invention, there is no particular restriction as to the cathode material. However, as the cathode material, there can be preferably used lithium-containing compounds such as $LiCoO_2$, $LiNiO_2$, $LiMn_2O_4$ and the like. A powdery cathode material is sufficiently kneaded with a binder and, as necessary, a conductive material, a solvent, etc. and the kneaded material is molded integrally with a current collector, whereby a cathode can be produced. There is no particular restriction as to the separator material, either, and a known separator material can be used appropriately.

As the non-aqueous solvent for electrolyte of lithium ion secondary battery, there can be used a known aprotic, low-dielectric constant solvent capable of dissolving the lithium salt used. There can be used, for example, ethylene carbonate, propylene carbonate, diethylene carbonate, acetonitrile, propionitrile, tetrahydrofuran, γ-butyrolactone, 2-methyltetrahydrofuran, 1,3-dioxolane, 4-methyl-1,3-dioxolane, 1,2-dimethoxyethane, 1,2-diethoxyethane, diethyl ether, sulfolane, methylsulfolane, nitromethane, N,N-dimethylformamide and dimethyl sulfoxide. They can be used singly or in admixture of two or more kinds.

The lithium salt used as the electrolyte includes $LiClO_4$, $LiAsF_6$, $LiPF_6$, $LiBF_4$, $LiB(C_6H_5)_4$, $LiCl$, $LiBr$, $CH_3SO_3Li$, $CF_3SO_3Li$, etc. These salts can be used singly or in admixture of two or more kinds.

Also when a lithium solid secondary battery or a polymer lithium secondary battery is produced, the composite material of the present invention can be used as an anode material, together with a known cathode, a known polymer electrolyte, a known solid electrolyte, etc., whereby a lithium secondary battery of high safety and high capacity can be produced.

EXAMPLES

Physical properties were measured as follows.

Average Particle Diameter and Particle Size Distribution

Measured using a laser diffraction type particle size distribution tester SALD-1000 produced by Shimadzu Corporation.

Specific Surface Area

Adsorbed nitrogen amount at a liquid nitrogen temperature was measured using a high-accuracy fully automatic gas adsorption tester BELSORP 28 produced by Nippon Bell Corporation, followed by calculation according to a BET method.

Carbon Amount of Covering Layer

A sample was heated to 900° C. in an air current, using a thermogravimetric analyzer TG-50 produced by Shimadzu Corporation. A weight decrease caused by the combustion of the covering layer carbon of the sample was measured, from which the carbon amount of the covering layer was calculated.

Void Ratio

A sample was measured for true density (ρ1) when heated (boiled) and also for apparent density (ρ2) without conducting heating, according to JIS K 2151; then, (ρ1−ρ2)/ρ1 was calculated and taken as the void ratio (by volume ratio) of the sample.

Specific Resistance

A copper-made lower cover was fitted to a polyvinyl chloride-made pipe having a sectional area of 2 cm². A predetermined amount (1 g) of a sample was placed in the pipe. A copper-made cylinder was inserted into the pipe from the upper end of the pipe. The sample was pressed via the cylinder at a pressure of 300 kg/cm².

The thickness (t) of the pressed sample was measured using a slide calipers, and the resistance (R) of the sample along the press direction was measured using an electric resistance tester AX-115A produced by Adex Co.

The specific resistance (SR) of the sample was calculated form the following formula.

$$SR=2R/t(\Omega\cdot cm)$$

Example 1

100 g of a graphite powder was added to 500 g of an extra pure silicon powder (purity: 98% by mass) produced by Wako Pure Chemical Industries, Ltd., to prepare a mixture. The mixture was subjected to a particle nuclei-producing step; that is, the mixture was subjected to grinding and granulation in an argon atmosphere for 120 hours, using a planetary ball mill, P-5 (a brand name) produced by Fleche Co. of Germany. The particle nuclei produced were sieved to obtain particle nuclei having particle diameters of 53 μm or less. Incidentally, the graphite powder had a specific resistance of 0.020 Ω·cm.

Figure 1:
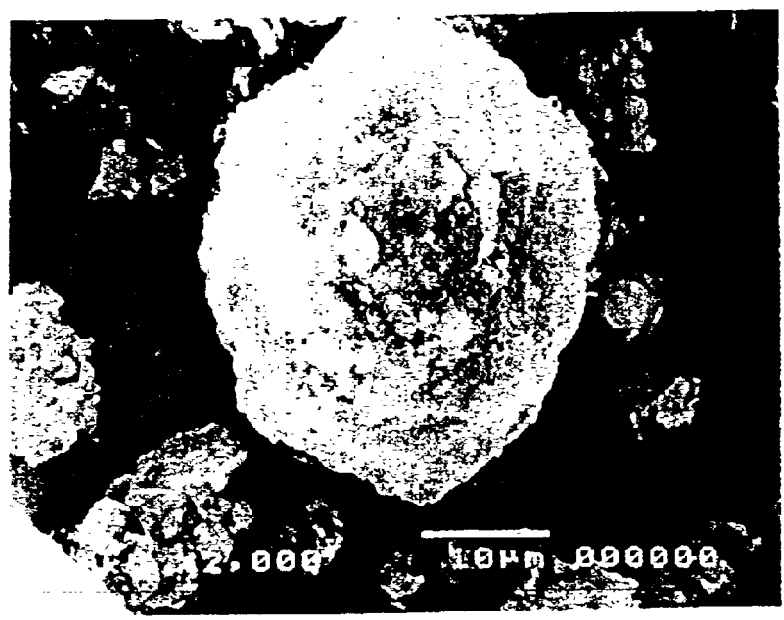
FIG. 1 is a microscopic photograph showing the porous particle nuclei produced in Example 1.
Figure 2:
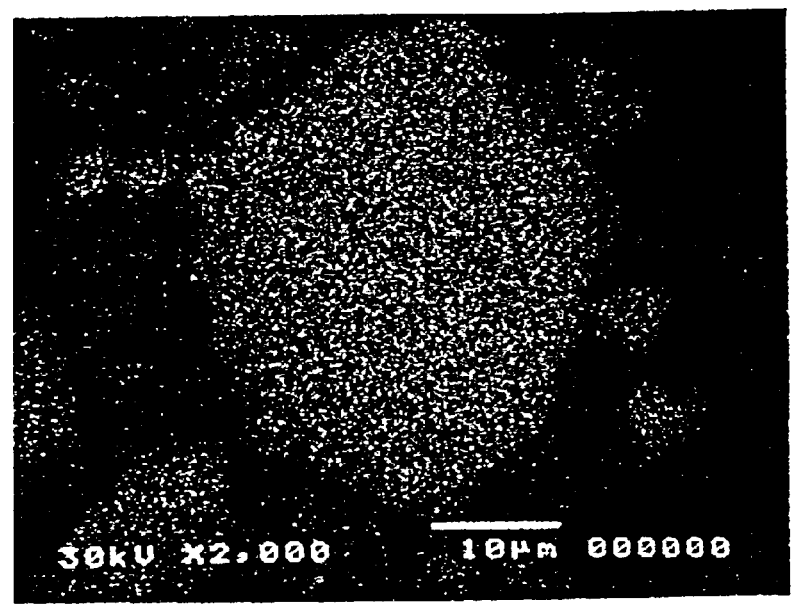
FIG. 2 is a sectional microscopic photograph taken by applying an X-ray to the porous particle nuclei of FIG. 1.

The microscopic photograph of the particle nuclei obtained is shown in FIG. 1 and FIG. 2.

FIG. 2 is a sectional photograph taken by applying an X-ray to the particle nuclei of FIG. 1, and the white dots are silicon-containing particles. It is clear from this photograph that silicon-containing particles are finely dispersed in each particle nucleus.

500 g of the above-obtained particle nuclei were placed in a stainless steel vessel having an internal volume of 1,000 ml. A nitrogen gas was introduced into the vessel from the vessel's bottom while the particle nuclei were being stirred, whereby the particle nuclei were put in a fluidized state by the nitrogen current. After the gas inside the vessel was completely substituted with the nitrogen gas, the vessel inside was heated to 950° C. while the particle nuclei were kept in a fluidized state, and a benzene vapor was introduced into the vessel from the vessel's bottom in the form of a mixture with the nitrogen gas; thereby, chemical vapor deposition was carried out for the particle nuclei. The concentration of benzene in nitrogen gas was 10% by mole.

The chemical vapor deposition was conducted for 180 minutes. Then, the particle nuclei subjected to the chemical vapor deposition was cooled to room temperature in a nitrogen current. Thereafter, the composite material (wherein a carbon covering layer was formed on the surface of the particle nuclei) obtained by the chemical vapor deposition, was taken out of the vessel. Then, the composite material was measured for carbon amount of covering layer, average particle diameter and specific surface area. The results are shown in Table 1.

Using the composite material, an anode was produced. Using the anode, a non-aqueous solvent type lithium secondary battery was produced. The lithium secondary battery was subjected to a charge-discharge test to examine the performance of the composite material as an anode.

The anode was produced as follows. To 2 g of the composite material was added 2 g of a binder, i.e. a carboxyl group-modified PVDF solution (L#9306, solid content: 6% by mass, a product of Kureha Chemical Industry Co., Ltd.), followed by thorough mixing to obtain a paste. The paste was coated on a copper foil and dried at 120° C. The resulting material was subjected to pressure molding at 1 ton/cm². The molded material obtained was cut into a disc of 16 mm in diameter. The disc was vacuum dried at 160° C. for 2 hours to obtain an anode.

The cathode was produced as follows using commercial $LiCoO_2$. 0.3 g of acetylene black as a conductivity aid was added to 5.0 g of $LiCoO_2$. Thereto was added a binder, i.e. N-methylpyrrolidone containing 0.3 g of a PVDF, followed by thorough mixing to form a paste. The paste was coated on an aluminum foil and dried at 120° C. The resulting material was subjected to pressure molding at 1 ton/cm². The molded material obtained was cut into a disc of 15.9 mm in diameter. The disc was dried at 160° C. for 2 hours to obtain a cathode.

As the solvent for electrolyte, there was used a 1:2 (volume ratio) mixed solvent consisting of ethylene carbonate and dimethyl carbonate.

The electrolyte was $LiPF_6$ and dissolved in the solvent for electrolyte in a concentration of 1.0 mole/l. The resulting electrolytic solution was impregnated into a glass fiber filter paper.

As the separator, a porous polypropylene nonwoven cloth was used. Using the above materials, a coin-shaped cell was produced in an argon atmosphere according to an ordinary procedure.

The charge-discharge test was conducted as follows.

Charge was conducted at a current density of 50 mA/g (0.4 mA/cm²) until the charge voltage increased to 3.9 V. The charge amount was 800 mAh/g only at the first charge. Discharge was conducted at a current density of 50 mA/g (0.4 mA/cm²) until the discharge voltage decreased to 2.5 V. Here, the current density is a current per g of the composite material used in the anode, and the value in the parenthesis is a current per cm² of the anode area. The charge amount is a charge amount per g of the composite material used in the anode. The charge amount and the discharge amount in each cycle were measured and (the discharge amount)/(the charge amount) was taken as the efficiency of each cycle. The change of the efficiency is shown in Table 2.

Figure 3:
FIG. 3 is a microscopic photograph showing the surface of the composite material of Example 1 when a lithium secondary battery was produced using the composite material and subjected to a 300 cycle charge and discharge test.

As seen in Table 2, the battery produced above had a high cycle performance, showed no decrease in efficiency up to 300 cycles, and gave no deterioration of anode. The shape of the composite material after 300 cycles was observed by an electron microscope, but there was no change in the shape or the like (FIG. 3).

Example 2

330 g of a graphite powder was added to 300 g of an extra pure silicon powder (purity: 98% by mass) produced by Wako Pure Chemical Industry Co., Ltd. They were subjected to grinding and granulation in an argon atmosphere for 12 hours, using a vibration ball mill, MB-1 (brand name) produced by Chuo Kakoki, to obtain particle nuclei. The stainless steel balls used had a diameter of 2.5 cm.

Figure 5:
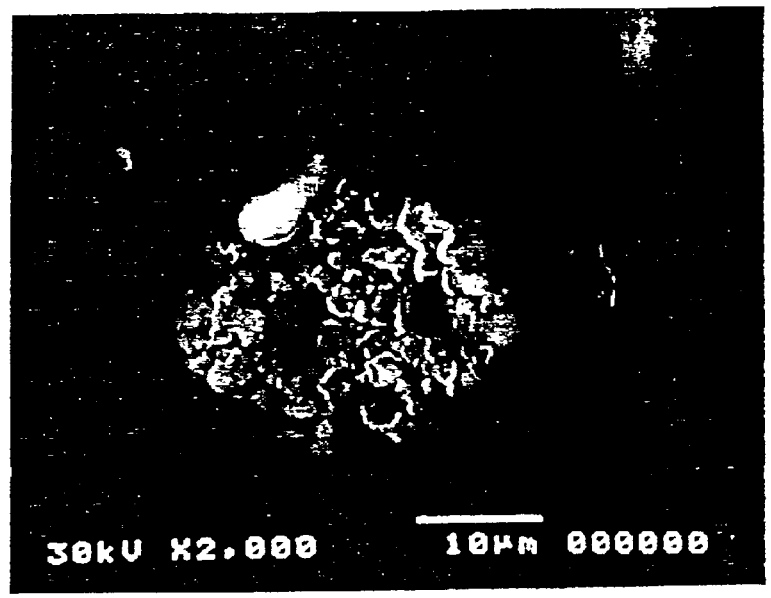
FIG. 5 is a microscopic photograph showing the sections of the porous particle nuclei of Example 2.
Figure 6:
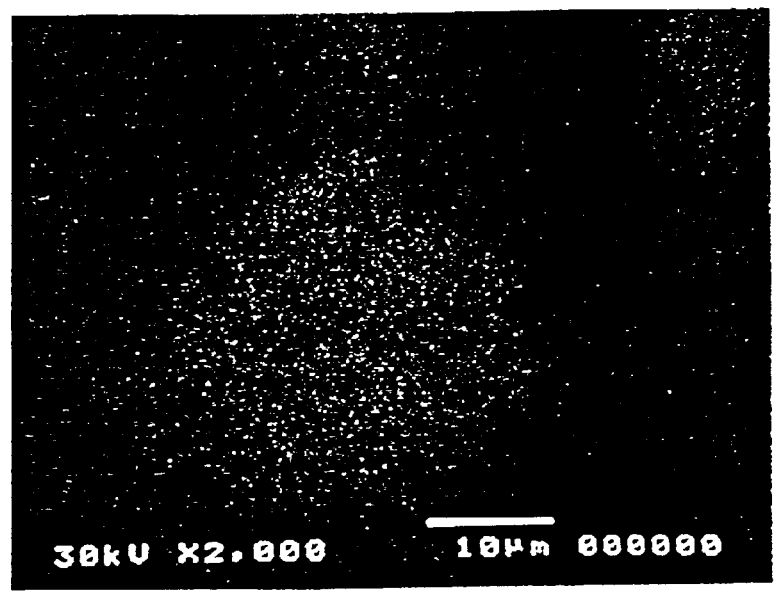
FIG. 6 is a sectional microscopic photograph taken by applying an X-ray to the porous particle nuclei of FIG. 5.

The microscopic photographs of the particle nuclei obtained are shown in FIG. 5 and FIG. 6.

FIG. 5 is a microscopic photograph showing the sections of the particle nuclei and indicates that a plurality of small particle nuclei form secondary bonding and that voids are present between the particles.

FIG. 6 is a sectional photograph taken by applying an X-ray to the particle nuclei of FIG. 5, wherein the white dots are silicon-containing particles. It is seen that the silicon-containing particles are finely dispersed in the particle nuclei. The void ratio of the particle nuclei was measured, which was 9.6 to 16.2% by volume.

The particle nuclei produced above were subjected to the same treatment as in Example 1, to obtain a composite material. The composite material was measured for physical properties in the same manner as in Example 1. The results are shown in Table 1. A battery was produced using the composite material, in the same manner as in Example 1 and subjected to the same charge-discharge test as in Example 1. The results are shown in Table 2.

As seen in Table 2, the battery using the above composite material as an anode material had a high cycle performance, showed no decrease in efficiency up to 300 cycles, and gave no deterioration of anode.

Example 3

100 g of acetylene black was added to 500 g of an extra pure silicon powder (purity: 98% by mass) produced by Wako Pure Chemical Industry Co., Ltd. They were subjected to the same treatment as in Example 2, to obtain a composite material. The composite material was measured for physical properties in the same manner as in Example 1. The results are shown in Table 1. A battery was produced using the composite material, in the same manner as in Example 1 and subjected to the same charge-discharge test as in Example 1. The results are shown in Table 2.

As seen in Table 2, the battery using the above composite material as an anode material had a high cycle performance, showed no decrease in efficiency up to 300 cycles, and gave no deterioration of anode. Incidentally, the acetylene black used had a specific resistance of 0.079 Ω·cm.

Example 4

The composite material obtained in Example 1 was subjected again to the same chemical vapor deposition as in Example 1, to obtain a composite material containing, in the covering layer, a larger amount of carbon than in the composite material of Example 1. The composite material was measured for physical properties in the same manner as in Example 1. The results are shown in Table 1. A battery was produced using the composite material, in the same manner as in Example 1 and subjected to the same charge-discharge test as in Example 1. The results are shown in Table 2.

As seen in Table 2, the battery using the above composite material as an anode material had a high cycle performance, showed no decrease in efficiency up to 300 cycles, and gave no deterioration of anode.

Comparative Example 1

500 g of an extra pure silicon powder (purity: 98% by mass) produced by Wako Pure Chemical Industry Co., Ltd. was subjected to the same treatment as in Example 1 (no carbon was added to the silicon powder) to obtain a composite material. The composite material was measured for physical properties in the same manner as in Example 1. The results are shown in Table 1. A battery was produced using the composite material, in the same manner as in Example 1 and subjected to the same charge-discharge test as in Example 1. The results are shown in Table 2.

The battery produced by using the above composite material as an anode material was low in cycle performance and deteriorated before 100 cycles. This indicates that the excellent battery performances of Examples 1 to 4 are owing to the presence of carbon-containing particles in each porous particle nucleus.

Comparative Example 2

330 g of a graphite powder was added to 300 g of an extra pure silicon powder (purity: 98% by mass) produced by Wako Pure Chemical Industry Co., Ltd. They were mixed in an argon atmosphere for 1 hour, using a blender, Wonder Blender (brand name) produced by Osaka Chemical. The mixture was subjected to the same treatment as in Example 1 to obtain a composite material. The composite material was measured for physical properties in the same manner as in Example 1. The results are shown in Table 1. A battery was produced using the composite material, in the same manner as in Example 1 and subjected to the same charge-discharge test as in Example 1. The results are shown in Table 2.

Figure 4:
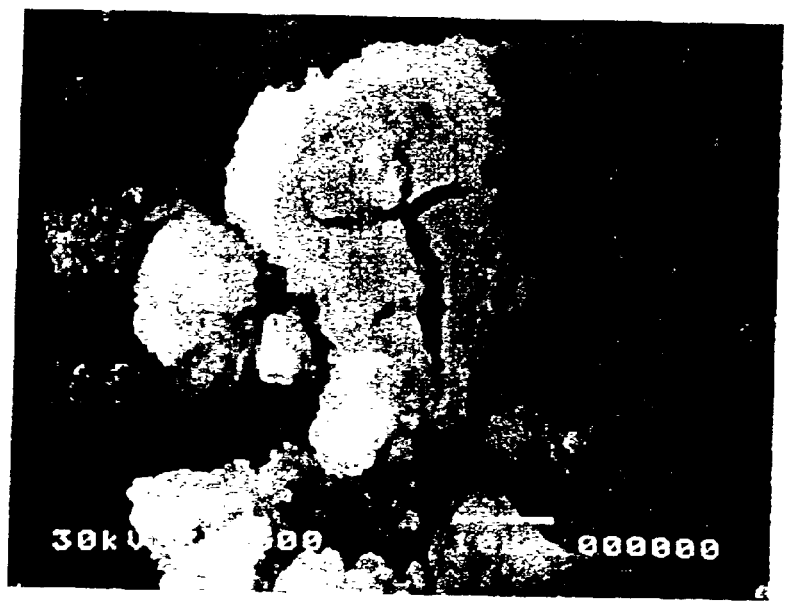
FIG. 4 is a microscopic photograph showing the breakage of the covering layer of the composite material of Comparative Example 2 when a lithium secondary battery was produced using the composite material and subjected to a 50–100 cycle charge and discharge test.

The battery produced by using the above composite material as an anode material was low in cycle performance and deteriorated before 100 cycles. Further, cracks appeared in the composite material after 50 cycles, as shown in FIG. 4. This indicates that since there was no formation of porous particle nuclei in which silicon-containing particles and carbon-containing particles bonded strongly to each other, the volume expansion associated with alloying of silicon could not be suppressed sufficiently and resultantly the destruction of the covering layer took place.

Comparative Example 3

100 g of a graphite powder was added to 500 g of an extra pure silicon powder (purity: 98% by mass) produced by Wako Pure Chemical Industry Co., Ltd. They were subjected to grinding and granulation in an argon atmosphere for 120 hours, using a small-ball mill, POTEX-5 (brand name) produced by Chuo Kakoki. The stainless steel balls used had a diameter of 2.5 cm.

The grinding and granulation product was subjected to the same treatment as in Example 1 to obtain a composite material. The composite material was measured for physical properties in the same manner as in Example 1. The results are shown in Table 1. A battery was produced using the composite material, in the same manner as in Example 1 and subjected to the same charge-discharge test as in Example 1. The results are shown in Table 2.

The battery produced by using the above composite material as an anode material was low in cycle performance and deteriorated before 100 cycles. This indicates that since there was no formation of porous particle nuclei in which silicon-containing particles and carbon-containing particles bonded strongly to each other, the volume expansion associated with alloying of silicon could not be suppressed-sufficiently and resultantly the destruction of the covering layer took place.

TABLE 1

|  | Particle nuclei Si/C (wt. %) | Production of particle nuclei Apparatus-time (hr) | | Carbon amount of covering layer (wt. %) | Average particle diameter (μm) | Specific surface area (m²/g) |
|---|---|---|---|---|---|---|
| Example 1 | 70/14 (Gr) | Planetary ball mill | 120 | 16 | 15 | 1.7 |
| Example 2 | 40/44 (Gr) | Vibration ball mill | 20 | 16 | 14 | 1.6 |
| Example 3 | 70/14 (AB) | Vibration ball mill | 12 | 16 | 14 | 2.0 |
| Example 4 | 57/11 (Gr) | Planetary ball mill | 120 | 32 | 21 | 1.5 |
| Comparative Example 1 | 84/0 | Planetary ball mill | 120 | 16 | 15 | 1.6 |
| Comparative Example 2 | 40/44 (Gr) | Blender | 1 | 16 | 15 | 1.8 |
| Comparative Example 3 | 70/14 (Gr) | Small-ball mill | 120 | 16 | 16 | 1.5 |

Gr: graphite
AB: acetylene black

TABLE 2

|  | Charge amount in initial charge (mAh/g) | Efficiency (%) | | | | |
|---|---|---|---|---|---|---|
|  |  | 1st cycle | 10th cycle | 50th cycle | 100th cycle | 300th cycle |
| Example 1 | 800 | 89.5 | 99.6 | 99.7 | 99.8 | 99.8 |
| Example 2 | 800 | 88.7 | 99.5 | 99.3 | 99.6 | 99.6 |
| Example 3 | 800 | 84.3 | 97.8 | 99.2 | 99.6 | 99.7 |
| Example 4 | 800 | 90.6 | 99.8 | 99.2 | 99.6 | 99.7 |
| Comparative Example 1 | 800 | 82.9 | 97.6 | 96.5 | Deteriorated | — |
| Comparative Example 2 | 800 | 86.5 | 96.5 | 97.2 | Deteriorated | — |
| Comparative Example 3 | 800 | 86.5 | 98.5 | 97.3 | Deteriorated | — |

What is claimed is:

1. A composite material for anode of lithium secondary battery, comprising:
   a porous particle nucleus having an average particle diameter of 1 to 50 μm formed by bonding of at least silicon-containing particles having particle diameters of 0.01 to 0.09 μm and carbon-containing particles having particle diameters of 0.01 to 0.29 μm and
   a layer made of carbon formed thereon.

2. A composite material for anode of lithium secondary battery, according to claim 1, having a specific surface area of 5 m²/g or less.

3. A composite material for anode of lithium secondary battery, according to claim 1, wherein the layer made of carbon in the composite material is in a proportion of 5 to 60% by mass.

4. A composite material for anode of lithium secondary battery, according to claim 1, wherein the silicon content in the porous particle nucleus is 10 to 90% by mass.

5. A composite material for anode of lithium secondary battery, according to claim 1, wherein the carbon-containing particles have a specific resistance of 1.0 Ω: cm or less.

6. An anode of lithium secondary battery, obtained by adhering a composite material for anode of lithium secondary battery set forth in claim 1, to a current collector.

7. A lithium secondary battery containing, in the anode, of a composite material for anode of lithium secondary battery set forth in claim 1.

8. A process for producing a composite material for anode of lithium secondary battery, which comprises:
   a particle nuclei-producing step of subjecting a mixture of silicon and carbon to grinding and granulation to produce porous particle nuclei, and
   a covering layer-forming step of forming a covering layer on each of the porous particle nuclei produce above.

9. A process for producing a composite material for anode of lithium secondary battery, according to claim 8, wherein the carbon has a specific resistance of 1.0 Ω cm or less.

10. A process for producing a composite material for anode of lithium secondary battery, according to claim 8, wherein the covering layer-forming step is conducted by chemical vapor deposition.

* * * * *